United States Patent
Lee et al.

(10) Patent No.: US 12,301,598 B2
(45) Date of Patent: *May 13, 2025

(54) INTRUSION DETECTION USING ROBUST SINGULAR VALUE DECOMPOSITION

(71) Applicant: AT&T INTELLECTUAL PROPERTY I, L.P., Atlanta, GA (US)

(72) Inventors: Melissa Lee, McKinney, TX (US); Johan Muedsam, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 560 days.

This patent is subject to a terminal disclaimer.

(21) Appl. No.: 17/446,453

(22) Filed: Aug. 30, 2021

(65) Prior Publication Data
US 2021/0392152 A1    Dec. 16, 2021

Related U.S. Application Data

(63) Continuation of application No. 15/989,512, filed on May 25, 2018, now Pat. No. 11,108,795.

(51) Int. Cl.
*H04L 9/40* (2022.01)
*H04L 29/06* (2006.01)

(52) U.S. Cl.
CPC ...... *H04L 63/1425* (2013.01); *H04L 63/1416* (2013.01)

(58) Field of Classification Search
CPC ............. H04L 63/1425; H04L 63/1416; H04L 63/1408; H04L 63/14; H04L 63/1433; H04L 63/16; H04L 63/20
See application file for complete search history.

(56) References Cited

U.S. PATENT DOCUMENTS

| 5,440,723 A | 8/1995 | Arnold et al. |
| 7,596,552 B2 | 9/2009 | Levy et al. |

(Continued)

FOREIGN PATENT DOCUMENTS

| CA | 2628121 A1 | 10/2009 |
| CN | 104980442 A | 10/2015 |

(Continued)

OTHER PUBLICATIONS

Chandola et al., "Anomaly Detection: A Survey", Department of Computer Science and Engineering, University of Minnesota, Aug. 15, 2007.

(Continued)

*Primary Examiner* — Edward Zee

(57) ABSTRACT

A method for detecting anomalous streaming network traffic data in real time includes: creating an anomaly detection model including a singular value matrix and a data pattern matrix from a matrix of historical network traffic data; storing the singular value matrix and the data pattern matrix of the anomaly detection model; receiving streaming network traffic data; performing a log transform on the streaming network traffic data; applying the anomaly detection model to a matrix of the streaming network traffic data in real time as the streaming network traffic data is received; detecting anomalous patterns in the streaming network traffic data based on patterns identified by the anomaly detection model; and associating the anomalous patterns in the streaming network traffic data with IP addresses.

20 Claims, 6 Drawing Sheets

(56) References Cited

U.S. PATENT DOCUMENTS

| | | |
|---|---|---|
| 7,752,665 B1 | 7/2010 | Robertson et al. |
| 7,961,957 B2 | 6/2011 | Schclar et al. |
| 8,015,604 B1 | 9/2011 | Tidwell et al. |
| 8,051,477 B2 | 11/2011 | Rockwell et al. |
| 8,209,759 B2 | 6/2012 | Newton et al. |
| 8,443,080 B2 | 5/2013 | Ding et al. |
| 8,458,109 B2 | 6/2013 | Zhang et al. |
| 8,533,825 B1 | 9/2013 | Marsa et al. |
| 8,561,184 B1 | 10/2013 | Marsa et al. |
| 8,640,015 B2 | 1/2014 | Ide et al. |
| 8,725,871 B2 | 5/2014 | Ding et al. |
| 9,680,693 B2 | 6/2017 | Barford et al. |
| 9,860,278 B2 | 1/2018 | Kurakami |
| 10,096,133 B1 | 10/2018 | Andreev |
| 10,148,680 B1 * | 12/2018 | Segev ................ H04L 63/1425 |
| 2003/0108042 A1 | 6/2003 | Skillicorn et al. |
| 2006/0026683 A1 | 2/2006 | Lim |
| 2012/0137367 A1 * | 5/2012 | Dupont .................. G06F 21/00 726/25 |
| 2015/0254566 A1 | 9/2015 | Chandramouli et al. |
| 2017/0104774 A1 | 4/2017 | Vasseur et al. |
| 2018/0039555 A1 * | 2/2018 | Salunke .............. G06F 11/3006 |
| 2018/0239966 A1 | 8/2018 | Xiao et al. |
| 2019/0155672 A1 | 5/2019 | Wang et al. |

FOREIGN PATENT DOCUMENTS

| | | |
|---|---|---|
| CN | 105100120 B | 11/2015 |
| CN | 103744994 A | 11/2016 |
| CN | 106790248 A | 5/2017 |
| CN | 107070943 B | 8/2017 |
| WO | 2017061893 A1 | 4/2017 |

OTHER PUBLICATIONS

Kline, "Traffic Anomaly Detection at Fine Time Scales with Bayes Nets", 2008.

Manandhar, "A Practical Approach to Anomaly-based Intrusion Detection System by Outlier Mining in Network Traffic", 2014.

Wang et al., "Identifying Intrusions in Computer Networks with Principal Component Analysis", Department of Computer Science and Telecommunications, University of Trento, 2006.

Wang et al., "Processing of Massive Audit Data Streams for Real-time Anomaly Intrusion Detection", ScienceDirect, 2008,58-72.

* cited by examiner

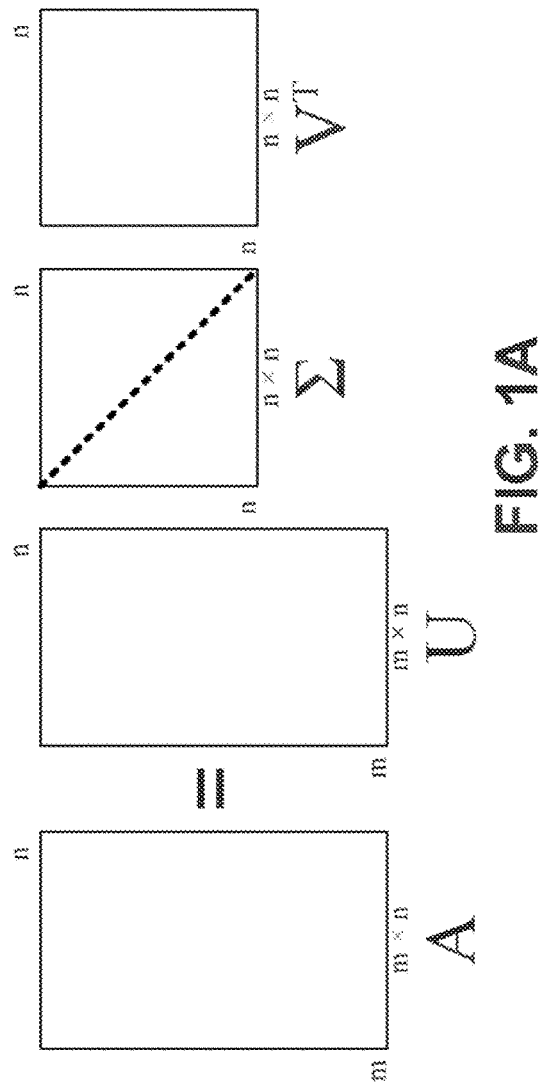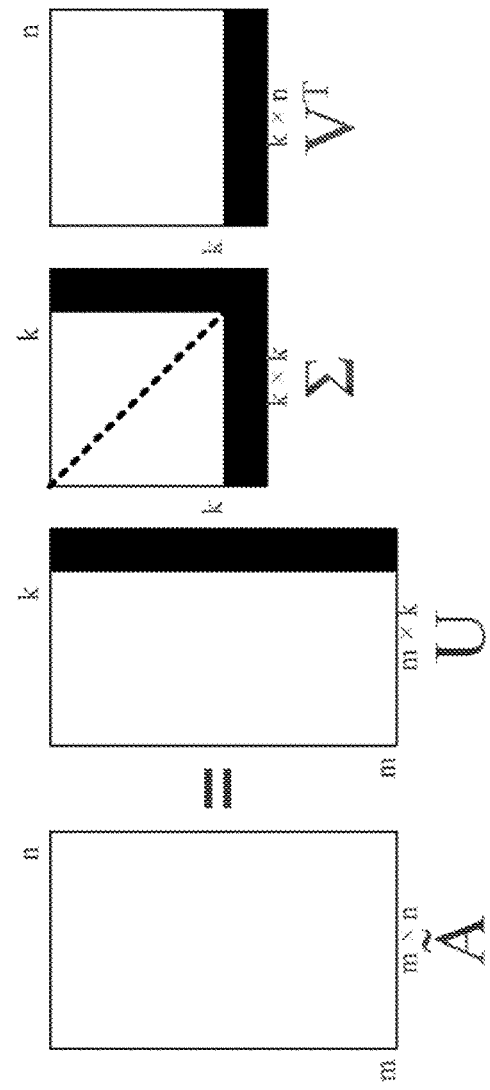

INTRUSION DETECTION USING ROBUST SINGULAR VALUE DECOMPOSITION

This application is a continuation of U.S. patent application Ser. No. 15/989,512, filed May 25, 2018, now U.S. Pat. No. 11,108,795, which is herein incorporated by reference in its entirety.

BACKGROUND

Intrusion detection systems are traditionally based on signature recognition of known threats. These types of systems are being out-smarted by cyber criminals signifying the need to include machine learning tools in security arsenals. However, the adoption of machine learning in security is difficult due to a lack of interpretability of the techniques and output from the models. Further, cyber criminals can manipulate algorithms built on network traffic data by intentionally injecting anomalous traffic into the training set.

SUMMARY

Systems and methods for intrusion detection using robust singular value decomposition are provided.

According to various aspects there is provided a method for detecting anomalous streaming network traffic data in real time. In some aspects, the method may include: creating an anomaly detection model including a singular value matrix and a data pattern matrix from a matrix of historical network traffic data; storing the singular value matrix and the data pattern matrix of the anomaly detection model; receiving streaming network traffic data; performing a log transform on the streaming network traffic data; applying the anomaly detection model to a matrix of the streaming network traffic data in real time as the streaming network traffic data is received; detecting anomalous patterns in the streaming network traffic data based on patterns identified by the anomaly detection model; and associating the anomalous patterns in the streaming network traffic data with IP addresses.

Creating the anomaly detection model may include aggregating volumetric data of the historical network traffic data based on temporal indicators; performing a log transform of the aggregated volumetric data; performing a low rank approximation of a matrix of aggregated historical network traffic data such that the matrix of aggregated historical network traffic data is decomposed into a low rank matrix and a sparse noise matrix; and performing singular value decomposition (SVD) on the low rank matrix to generate the singular value matrix and the data pattern matrix. The singular value matrix and the data pattern matrix may form the anomaly detection model, and temporal indicators comprise at least one of a timestamp, an IP address, a TCP flag, a traffic direction, and port and protocol information. The low rank approximation is performed using a principal component pursuit methodology.

Detecting anomalous patterns may include calculating a matrix of the streaming network traffic data in singular value decomposition (SVD) space using the singular value matrix and the data pattern matrix; transforming the matrix of the streaming network traffic data from the SVD space to data space using the singular value matrix and the data pattern matrix; performing an error calculation between a row of the matrix of the streaming network traffic data and a corresponding row of the transformed matrix of the streaming network traffic data; and determining whether an error calculation value exceeds a threshold value. Performing the error calculation may include performing a sum of squared error (SSE) calculation between a row of the matrix of the streaming network traffic data and the corresponding row of the transformed matrix of the streaming network traffic data.

Calculating the matrix of the streaming network traffic data in SVD space may include solving a matrix equation $Ux=XV\Sigma^{-1}$, where $Ux$ is the matrix of the streaming network traffic data in SVD space, $X$ is a matrix of the streaming network traffic data, $V$ is the data pattern matrix of the anomaly detection model, and $\Sigma^{-1}$ is an inverse of the singular value matrix of the anomaly detection model. Transforming the matrix of the streaming network traffic data from the SVD space to data space may include solving a matrix equation $\hat{X}=Ux\Sigma V^T$, where $\hat{X}$ is the transformed matrix in the data space, $Ux$ is the matrix of the streaming network traffic data in SVD space, $\Sigma$ is the singular value matrix, and $V^T$ is the transpose of the data pattern matrix.

The method may further include scoring a severity of an anomalous patterns in the streaming network traffic data based on patterns identified by the anomaly detection model. Detecting anomalous patterns in the streaming network traffic data may include performing an error calculation between a row of the matrix of the streaming network traffic data and a corresponding row of a reconstructed matrix of the streaming network traffic data; assigning a value to a result of the error calculation based on a cumulative distribution function (CDF) for a plurality of error calculation results; determining whether a CDF value for the error calculation exceeds a specified threshold CDF value; and in response to determining that the CDF value for the error calculation exceeds the specified threshold CDF value, identifying the corresponding streaming network traffic data as anomalous. The CDF may be based on shape and scale parameters of an exponentiated Weibull probability distribution function (PDF) fitted to the plurality of error calculation results.

According to various aspects there is provided a system for detecting anomalous streaming network traffic data in real time. In some aspects, the system may include: a memory; a network interface; and one or more processors in communication with the memory and the network interface, the one or more processors configured to; create an anomaly detection model including a singular value matrix and a data pattern matrix from a matrix of historical network traffic data; store the singular value matrix and the data pattern matrix of the anomaly detection model; receive streaming network traffic data; perform a log transform on the streaming network traffic data; apply the anomaly detection model to a matrix of the streaming network traffic data in real time as the streaming network traffic data is received; detect anomalous patterns in the streaming network traffic data based on patterns identified by the anomaly detection model; and associate the anomalous patterns in the streaming network traffic data with IP addresses.

The one or more processors may be further configured to aggregate volumetric data of the historical network traffic data based on temporal indicators; perform a log transform of the aggregated volumetric data; perform a low rank approximation of a matrix of aggregated historical network traffic data such that the matrix of aggregated historical network traffic data is decomposed into a low rank matrix and a sparse noise matrix; and perform singular value decomposition (SVD) on the low rank matrix to generate the singular value matrix and the data pattern matrix. The temporal indicators may include at least one of a timestamp, an IP address, a TCP flag, a traffic direction, and port and protocol information. The one or more processors may be configured to perform the low rank approximation using a principal component pursuit methodology.

The one or more processors may be further configured to calculate a matrix of the streaming network traffic data in singular value decomposition (SVD) space using the singular value matrix and the data pattern matrix; transform the matrix of the streaming network traffic data from the SVD space to data space using the singular value matrix and the data pattern matrix; perform an error calculation between a row of the matrix of the streaming network traffic data and a corresponding row of the transformed matrix of the streaming network traffic data; and determine whether an error calculation value exceeds a threshold value. The one or more processors may be further configured to score a severity of an anomalous patterns in the streaming network traffic data based on patterns identified by the anomaly detection model.

The one or more processors may be further configured to perform an error calculation between a row of the matrix of the streaming network traffic data and a corresponding row of a reconstructed matrix of the streaming network traffic data; assign a value to a result of the error calculation based on a cumulative distribution function (CDF) for a plurality of error calculation results; determine whether a CDF value for the error calculation exceeds a specified threshold CDF value; and in response to determining that the CDF value for the error calculation exceeds the specified threshold CDF value, identify the corresponding streaming network traffic data as anomalous.

According to various aspects there is provided a method for creating an anomaly detection model for real-time detection of anomalies in streaming network traffic data. In some aspects, the method may include: aggregating volumetric data of historical network traffic data based on temporal indicators; performing a log transform of the aggregated volumetric data; performing a low rank approximation of a matrix of aggregated historical network traffic data such that the matrix of aggregated historical network traffic data is decomposed into a low rank matrix and a sparse noise matrix; performing singular value decomposition (SVD) on the low rank matrix to generate a singular value matrix and a data pattern matrix, wherein the singular value matrix and the data pattern matrix form the anomaly detection model; and storing the anomaly detection model, wherein the anomaly detection model is configured to associate anomalous patterns in the streaming network traffic data with IP addresses.

The method may further include performing the low rank approximation of the matrix using a principal component pursuit methodology. Aggregating the volumetric data may include combining the volumetric data with one or more temporal indicators. The temporal indicators comprise one or more of a timestamp, an IP address, a TCP flag, and port and protocol information.

Other features and advantages should be apparent from the following description which illustrates by way of example aspects of the various teachings of the disclosure.

BRIEF DESCRIPTION OF THE DRAWINGS

Aspects and features of the various embodiments will be more apparent by describing examples with reference to the accompanying drawings, in which:

FIG. 1A is a graphical depiction of SVD of a matrix A according to various aspects of the present disclosure;

FIG. 1B is a graphical depiction of SVD of a low rank approximation of a matrix A;

DETAILED DESCRIPTION

Figure 2:
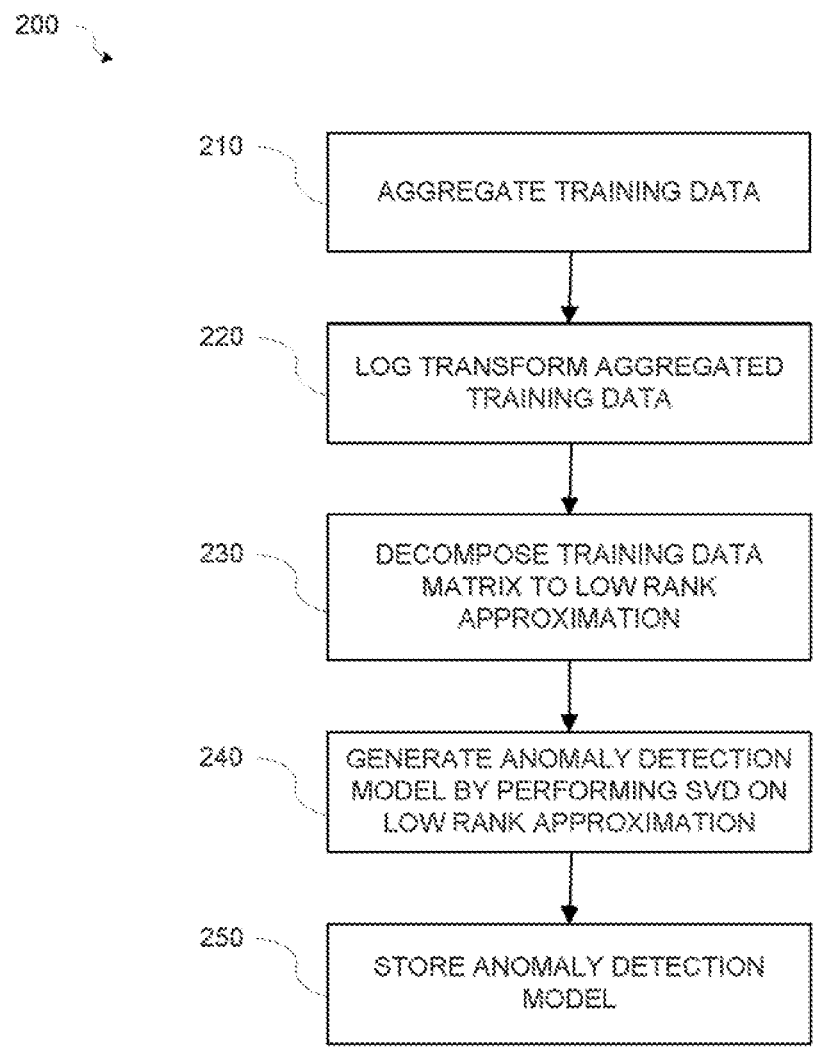
FIG. 2 is a flowchart illustrating a method for generating an anomaly detection model according to various aspects of the present disclosure according to various aspects of the present disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Network traffic data can be described in general terms as data that moves across a network at a point in time. In some cases, it may be desirable to observe network traffic between an Internet provider and various network operators to detect anomalous or malicious behavior. An assumption may be made that underlying relationships exist among normal data in a data set that are not shared by malicious data. Unsupervised machine learning algorithms allow for the detection of suspicious activity by identifying deviations from normal behavior relative to current patterns in the data. In accordance with various aspects of the present disclosure, an unsupervised technique to detect, prioritize, and inspect anomalous behavior of IP addresses in network traffic data using robust singular value decomposition (RSVD) and a probabilistic scoring methodology is provided.

An anomaly detection model may be constructed for the unsupervised machine learning algorithm using a historical network traffic data set. The historical network traffic data set may be aggregated to create a meaningful data set. For example, volumetric data (e.g., bytes and packets transferred) may be combined with temporal indicators, for example, but not limited to, timestamp, IP address, TCP flags, traffic direction, port and protocol information, etc., to build a feature set from the historical network traffic data set. For feature generation, the data may be partitioned and aggregated by protocol name, hour time bins, and destination IPs. In other words, for each destination IP address, a set of features may be generated over connected source IP addresses for each protocol and hour bin. The feature set may provide an indication of network traffic behavior over a period of time.

The RSVD methodology separates noise from an original data set before building the model. In this regard, RSVD limits any influence that the noise, which might be malicious activity, would have on the model. The extreme features of the data set are cleansed prior to building the model so that the model does not learn anomalous behavior as normal behavior. Principal Component Pursuit or similar methodology may be used to identify noise and/or outliers to be cleansed from the data set. Once the data set has been cleansed, the matrix containing the cleansed data set may be decomposed using SVD to generate the anomaly detection model.

In accordance with various aspects of the present disclosure, a matrix A of training data (i.e., the aggregated historical network traffic data) may be log transformed to minimize skewness, and the matrix decomposed to a low rank approximation. Using the Principal Component Pursuit method, the matrix a may be decomposed such that $A=L_0+S_0$, where $S_0$ represents a sparse noise matrix, and the low rank matrix $L_0$ becomes the A matrix of "cleansed" data used in the equations to create the anomaly detection model (i.e., the $\Sigma$ and V matrices) using Singular value decomposition (SVD). Separating the noise from the cleansed data makes the process more "robust." Using RSVD network traffic data may be analyzed in real-time to detect malicious activity.

Singular value decomposition (SVD) is a process of matrix factorization. FIG. 1A is a graphical depiction of the SVD process for a matrix A. Referring to FIG. 1A, if A (i.e., the matrix containing the cleansed training data set) is an m×n matrix, then A can be represented as a product of three factors as in equation (1):

$$A = U\Sigma V^T, \qquad (1)$$

where U is an orthogonal m×n matrix, V is an orthogonal n×n matrix, $V^T$ represents the transpose of the matrix V, and $\Sigma$ is a diagonal n×n singular value matrix. The V matrix (or its transpose, $V^T$) contains prominent patterns in the data identified from the training data. The $\Sigma$ matrix contains values that indicate the importance of each of the data patterns contained in the V (or $V^T$) matrix. The U matrix contains a projection into the SVD space of the actual data set from the A matrix.

FIG. 2 is a flowchart illustrating a method 200 for generating an anomaly detection model according to various aspects of the present disclosure. Referring to FIG. 2, at block 210, historical network traffic training data set may be aggregated. For example, volumetric data may be combined with temporal indicators to aggregate the data to provide an indication of network traffic behavior over a period of time. At block 220, training data is log transformed to reduce skewness in the data. At block 230, a matrix A of the log transformed training data is decomposed to a low rank matrix approximation. The low rank matrix approximation may be performed using the Principal Component Pursuit method, such that $A=L_0+S_0$, where $S_0$ represents noise and the low rank matrix $L_0$ becomes the A matrix of "cleansed" data (making the process "robust") used in the equations to create the anomaly detection model (i.e., the $\Sigma$ and V matrices).

At block 240, SVD may be performed on the cleansed A matrix (i.e., $L_0$) in accordance with equation (1) to obtain the $\Sigma$ and V matrices. The $\Sigma$ and V matrices may be the anomaly detection model. The V matrix may contain prominent data patterns and the $\Sigma$ matrix may contain values indicating the relative importance of each of the prominent data patterns in the V matrix. At block 250, the $\Sigma$ and V matrices may be stored, for example, in a memory or other storage device, for use in processing streaming data.

In accordance with various aspects of the present disclosure, a scoring model may be generated to score the severity of detected anomalous network traffic. Using the stored $\Sigma$ and V matrices and a matrix B of untrained historical network traffic data, for example one week's worth of data, a matrix $U_B$ in the SVD domain corresponding to the untrained historical network traffic data B may be calculated according to equation (2):

$$U_B = BV\Sigma^{-1} \qquad (2)$$

The matrix $U_B$ may be transformed from the SVD domain to the data domain and reconstructed as the matrix $\tilde{B}$ using equation (3):

$$\tilde{B} = U_B \Sigma V^T \qquad (3)$$

An error calculation, for example, but not limited to, a relative sum of squared error (SSE), may be performed between each row of the untrained historical network traffic data matrix B and the corresponding row of the reconstructed untrained historical network traffic data matrix $\tilde{B}$, and the error values for each row may be stored as error calculation results (i.e., raw data or raw scores).

A probability distribution function (PDF), for example, an exponentiated Weibull (EW) PDF or another PDF, may be fitted to a histogram of the stored raw data. The EW PDF may be used because it takes into account the skewed nature of the raw SSE values and is highly flexible in the kind of shapes that it can fit. The several PDF shape and scale parameters that are the output for the fitted PDF may be stored, for example, in a memory or other storage device.

Using the stored PDF shape and scale parameters, a cumulative distribution function (CDF) may be used to transform the error calculation result from each row SSE calculation to scaled CDF values to permit correlation with anomalous behavior across different groups of data or across different sets of data. When the EW PDF is used, the CDF values may be calculated from the SSE error calculation results using equation (4):

$$F_{EW}(x|\gamma, \beta, \alpha) = \left\{-\left[\exp\left(-\frac{x}{\beta}\right)^\gamma - 1\right]\right\}^\alpha, \qquad (4)$$

where $\gamma$, $\beta$, and $\alpha$ may be the PDF shape and scale parameters of the fitted PDF, and x may be a raw SSE row calculation result. The "extremeness" of an SSE is quantified by a probability produced by the CDF. For example, a transformed CDF value of 0.99 means that approximately 99% of all other values are lower than that value. As opposed to simply reporting raw error scores, creation of the scoring model enables anomalies to be ranked and compared across different models and different data sets.

A cutoff, or threshold, value for the CDF indicating the severity of the detected anomalous network traffic may be specified. For example, a threshold value of 0.95 or another score may be specified. When a CDF value for a row exceeds the specified threshold value, an IP address corresponding to the anomalous network traffic may be identified and ranked according to the severity of the detected anomaly. The corresponding detected anomalous network traffic may be reported, for example, to a security analyst or other personnel, for further investigation, and/or a message including the specific information about a detected anomaly may be sent to another computer system. Rather than simply providing a network-wide alert, specific IP addresses associated with the anomalous network traffic may be targeted for further investigation.

Figure 3:
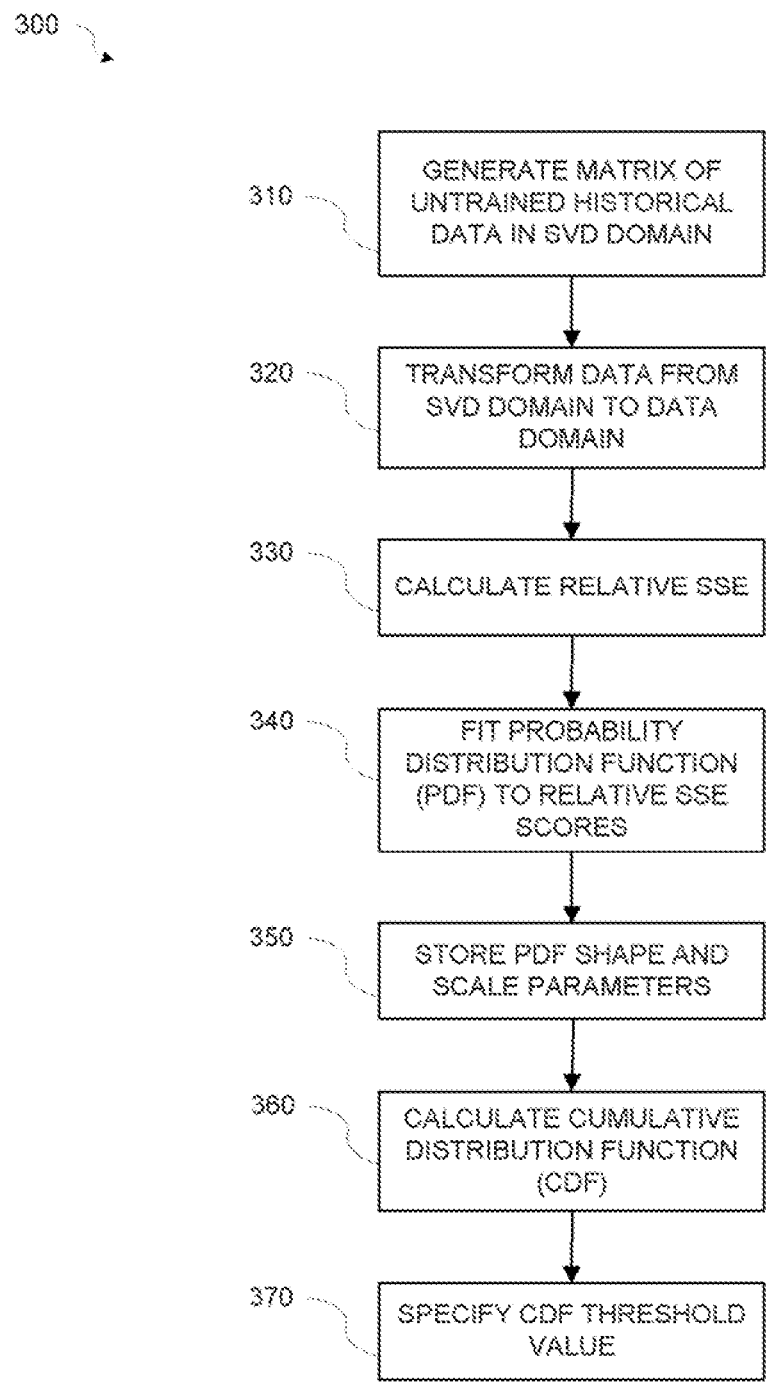
FIG. 3 is a flowchart illustrating a method for generating a scoring model according to various aspects of the present disclosure.

FIG. 3 is a flowchart of a method 300 for generating a scoring model according to various aspects of the present disclosure. Referring to FIG. 3, at block 310, a matrix $U_B$ in the SVD domain may be calculated according to equation (2) using the previously stored $\Sigma$ and V matrices (i.e., the matrices calculated for the anomaly detection model) and a matrix, B, of untrained historical network traffic data. At block 320, the matrix $U_B$ may be transformed from the SVD domain to the data domain and reconstructed as the matrix $\tilde{B}$ using equation (3).

At block 330, an error calculation, for example, but not limited to, a relative sum of squared error (SSE) calculation, between each row of the untrained historical network traffic data matrix B and a corresponding row of the reconstructed untrained historical network traffic data matrix $\tilde{B}$ may be performed. At block 340, a probability distribution function (PDF), for example, an exponentiated Weibull (EW) PDF or another PDF, may be fitted to a histogram of the error calculation results. Several PDF shape and scale parameters may be output from the fitted PDF. At block 350, the PDF shape and scale parameters may be stored, for example, in a memory or other storage device.

At block 360, the CDF may be calculated using the stored PDF shape and scale parameters. For example, when the EW PDF is used, the CDF may be calculated from the SSE row scores using equation (4). At block 370, a threshold CDF value may be specified. A CDF value exceeding the threshold CDF value may be an indication of severely anomalous network traffic.

Figure 4:
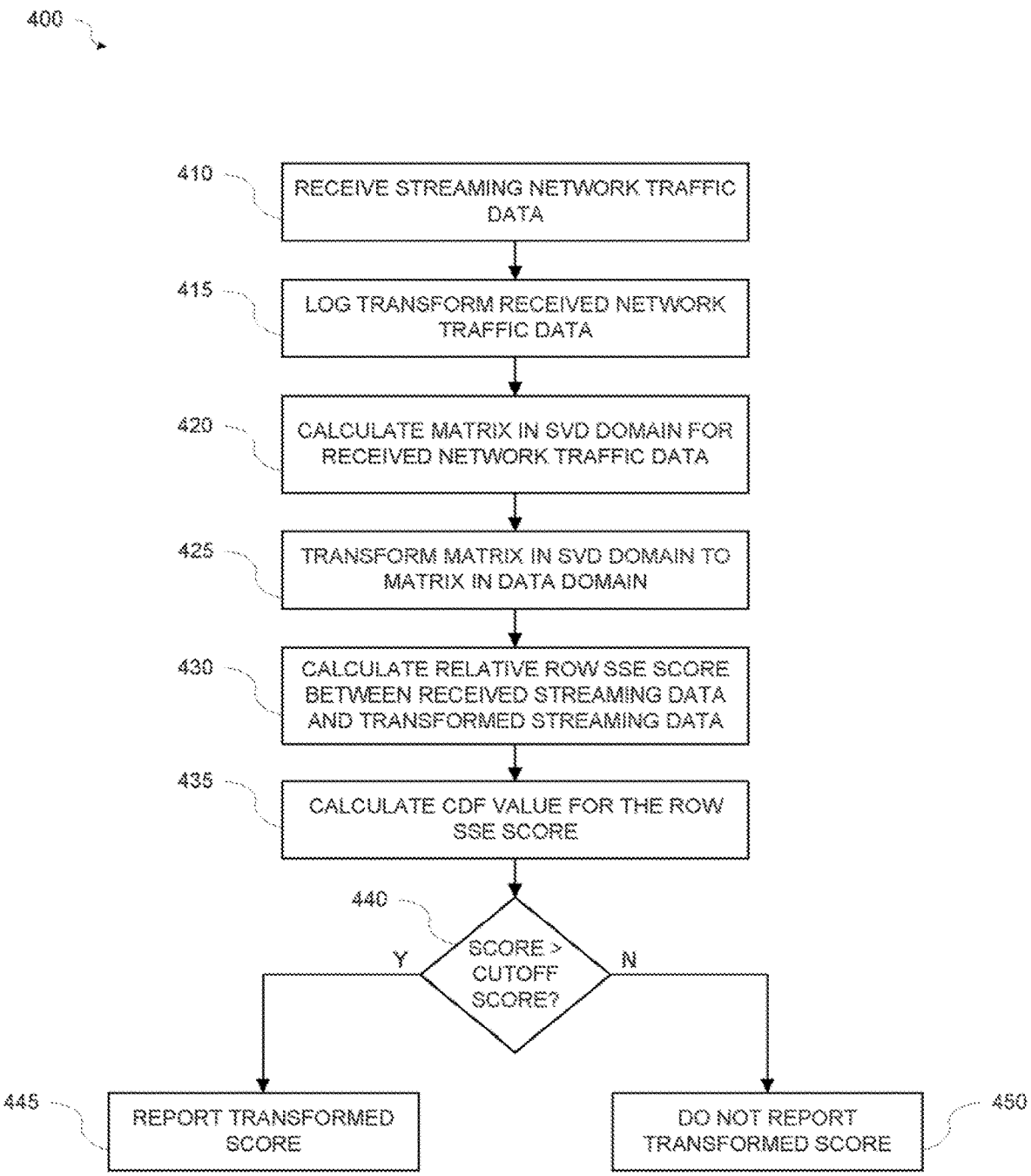
FIG. 4 is a flowchart illustrating a method for detecting anomalous network traffic according to various aspects of the present disclosure.

In accordance with various aspects of the present disclosure, the anomaly detection model and scoring model may be used to detect and score anomalous network traffic in real-time. FIG. 4 is a flowchart illustrating a method 400 for detecting and scoring anomalous network traffic according to various aspects of the present disclosure. Referring to FIG. 4, at block 410, streaming network traffic data X may be received. At block 415, the streaming network traffic data X may be log transformed to reduce skewness in the data.

At block 420, a matrix Ux in the SVD domain corresponding to the log transformed streaming network traffic data X may be calculate according to equation (5):

$$U_X = XV\Sigma^{-1}, \quad (5)$$

where V and $\Sigma$ are the stored matrices of the anomaly detection model.

At block 423, the matrix Ux may be transformed from the SVD domain to the data domain and reconstructed as the matrix $\tilde{X}$ using equation (6):

$$\tilde{X} = U_X \Sigma V^T, \quad (6)$$

where again, V and $\Sigma$ are the stored matrices of the anomaly detection model. Attempted intrusions may present as activity that does not follow normal data patterns as represented by the anomaly detection model. The reconstructed $\tilde{X}$ matrix is presumed to be ill-represented by the low-rank approximation and, as such, fails to be accurately reconstructed.

At block 430, a relative sum of squared error (SSE) between a row of the streaming data matrix X and a corresponding row of the reconstructed streaming data matrix $\tilde{X}$ may be calculated.

At block 435, a CDF value for the SSE value of the row may be calculated. For example, when the EW PDF is used, CDF values may be calculated using equation (7):

$$F_{EW}(x \mid \gamma, \beta, \alpha) = \left\{ -\left[ \exp\left(-\frac{x}{\beta}\right)^{\gamma} - 1 \right] \right\}^{\alpha}, \quad (7)$$

where $\gamma$, $\beta$, and $\alpha$ may be the previously stored PDF shape and scale parameters, and x may be the raw SSE row score. The CDF may be applied to each SSE row error calculation in real-time as streaming data X is received.

At block 440 it may be determined whether the CDF value for the row exceeds the specified CDF threshold value. In response to determining that the CDF value for the row exceeds the CDF threshold value (440-Y), at block 445, the CDF value for the row and the corresponding network traffic data may be reported, for example, as a report to a security analyst for further investigation of the corresponding network traffic data. In response to determining that the CDF value for the row does not exceed the threshold value (440-N), at block 450, the CDF value may not be further reported.

Figure 5A:
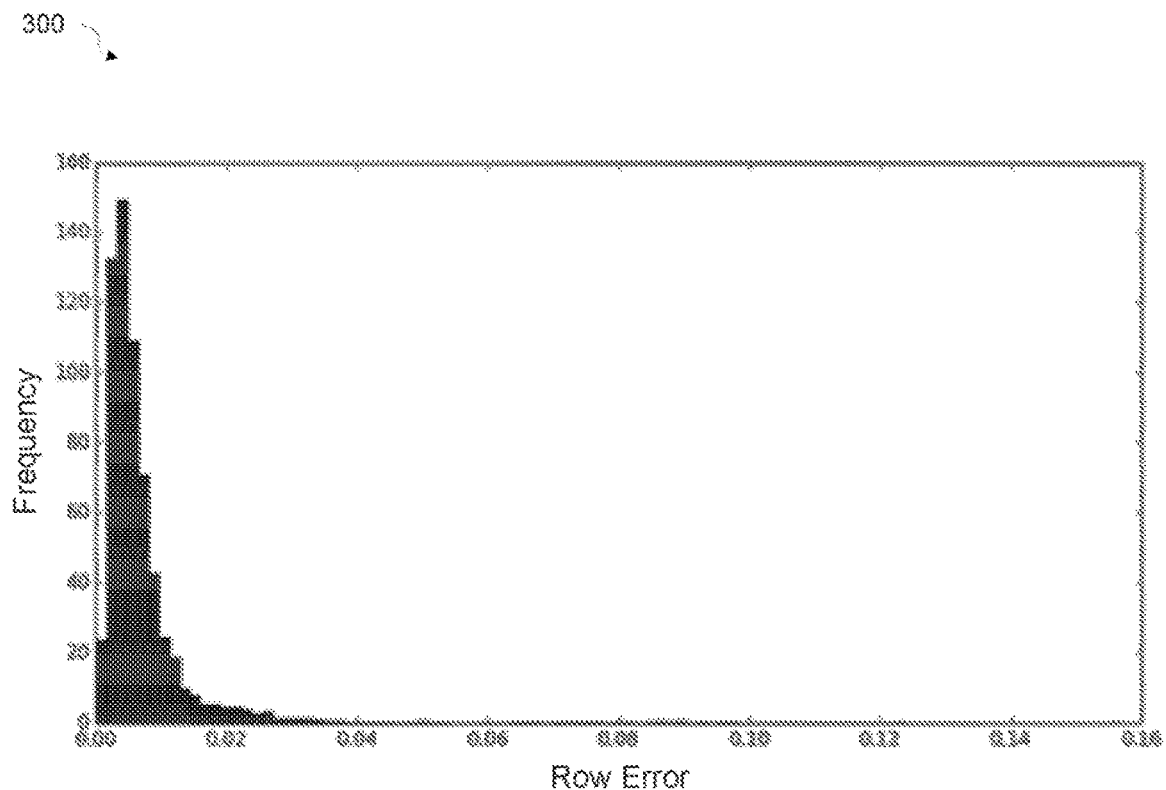
FIG. 5A is a histogram illustrating an example of raw scores for an anomaly detection model exhibiting acceptable performance according to various aspects of the present disclosure.
Figure 5B:
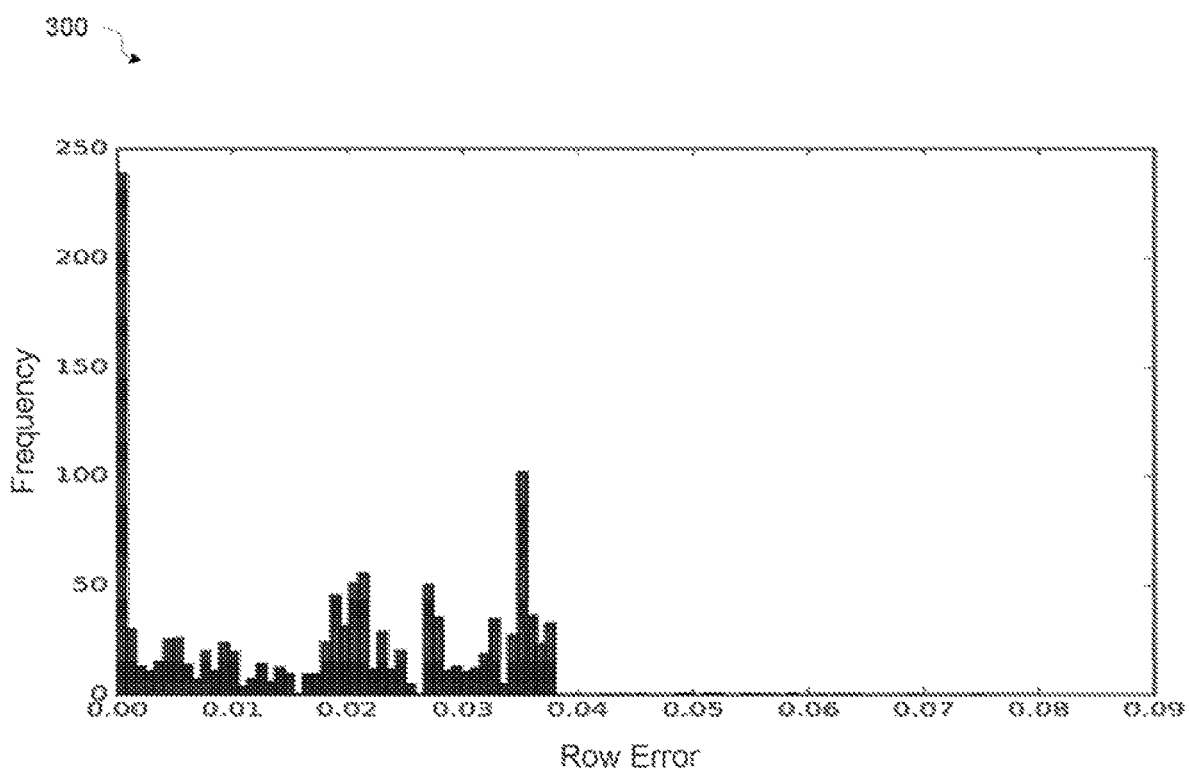
FIG. 5B is a histogram illustrating an example of raw scores for an anomaly detection model exhibiting degraded performance according to various aspects of the present disclosure.

In accordance with various aspects of the present disclosure, performance of the anomaly detection model may be periodically evaluated. As the SSE row error calculation values for new streaming network traffic data begin to degrade, for example over a period of weeks or another time period, a new A matrix (i.e., $L_0$) may be created with more recent network traffic data and new $\Sigma$ and V matrices (i.e., a new anomaly detection model) may be generated. FIG. 5A is a histogram illustrating an example of row error values for an anomaly detection model exhibiting acceptable performance according to various aspects of the present disclosure. FIG. 5B is a histogram illustrating an example of row error values for an anomaly detection model exhibiting degraded performance according to various aspects of the present disclosure. As can be seen in FIGS. 5A and 5B, as performance degrades, the existing anomaly detection model exhibits significant spread in severity of error versus frequency of occurrence.

When it is determined that the existing anomaly detection model exhibits significant spread in severity of error versus frequency of occurrence, for example as determined by a security analyst or by other means known to those of skill in the art, the method 200 for generating an anomaly detection model and the method 300 for generating a scoring model may be performed using more recent network traffic data to generate a new anomaly detection model and a new scoring model.

One of ordinary skill in the art will appreciate that the methods 200, and 300, respectively, may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

Figure 6:
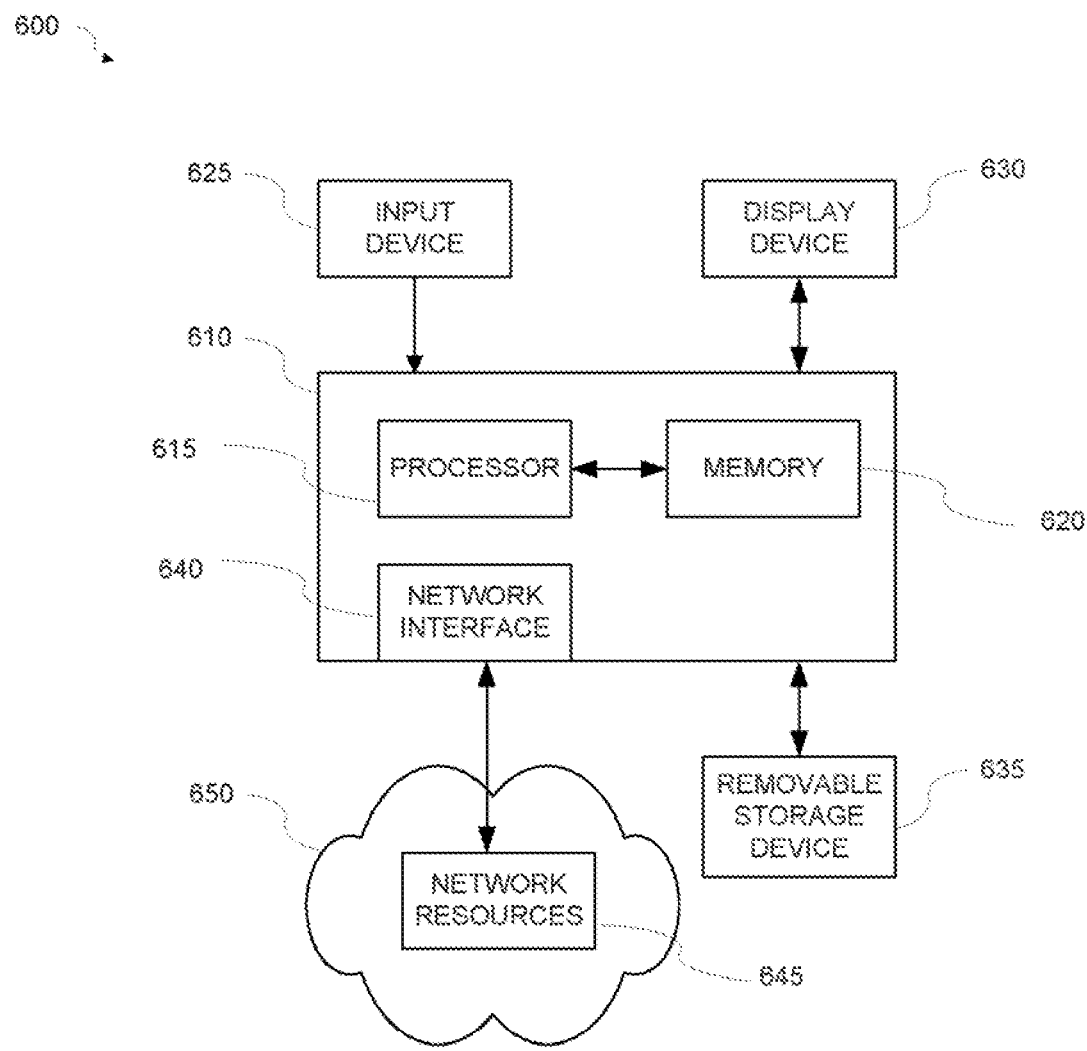
FIG. 6 is a block diagram illustrating a computer/server system according to various aspects of the present disclosure.

In accordance with various aspects of the present disclosure, various embodiments may be implemented on a computer/server system. FIG. 6 is a block diagram illustrating a computer/server system 600 according to various aspects of the present disclosure. Referring to FIG. 6, the system 600 may include a computer/server platform 610 including a processor 615 and memory 620, an input device 625, a display device 630, a removable storage device 635, and a network interface 640. The processor 615 may be, for example, but not limited to, a computer, minicomputer, processor, microprocessor, microcontroller, or other programmable device that may operate to execute instructions, embodied on a computer readable storage medium, as known to one of skill in the art. The processor 615 may cause the computer/server system 600 to perform the operations of the methods 200 and 300, respectively. The term "computer-readable storage medium" as used herein refers to any tangible medium, for example, but not limited to, a disk or semiconductor memory, that participates in providing instructions to processor 615 for execution.

The computer platform 610 may receive input from a plurality of input devices 625, for example, but not limited to, a keyboard, mouse, touch device, or verbal command input device. The computer/server platform 610 may additionally be connected to a removable storage device 635, for example, but not limited to, a portable hard disk drive, optical media (CD or DVD), disk media or any other tangible medium from which a computer can read executable code. The computer/server platform 610 may further be connected to network resources 645 which connect to the Internet or other components of a local public or private network.

The network resources 645 may provide instructions and information to the computer platform from a remote location on a network 650. The connections to the network resources 645 may be via wireless protocols, for example, but not limited to, the 802.11 standards, Bluetooth® or cellular protocols, or via physical transmission media, such as cables or fiber optics. The network resources may include storage devices for storing information and executable instructions at a location separate from the computer/server platform 610. The computer platform 610 may interact with a display device 630 to output information to a user, as well as to request additional instructions and input from the user. The display device 630 may therefore further act as an input device 625 for interacting with a user.

In an exemplary embodiment, the computer/server platform 610 may cause the anomaly detection model to be generated and stored in the memory 620. The computer/server platform 610 may receive streaming network traffic data. For example, the computer/server platform 610 may receive network traffic data from a network resources 645 via the network interface 640. The computer/server platform 610 may cause the stored anomaly detection model to be applied to the streaming network traffic data. The computer/server platform 610 may further calculate a score and output an indication of detected anomalous data patterns. For example, the computer/server platform 610 may apply the scoring model to the detected anomalous data patterns and, if a score exceeds a threshold value, may associate the anomalous data patterns with IP addresses and output the corresponding information including the associated IP addresses via the display device 630.

The examples and embodiments described herein are for illustrative purposes only. Various modifications or changes in light thereof will be apparent to persons skilled in the art. These are to be included within the spirit and purview of this application, and the scope of the appended claims, which follow.

The invention claimed is:

1. A method comprising:
creating an anomaly detection model including a singular value matrix and a data pattern matrix from a matrix of historical network traffic data, wherein the creating the anomaly detection model comprises:
aggregating volumetric data of the historical network traffic data based on temporal indicators;
performing a log transform of the volumetric data that is aggregated;
performing a low rank approximation of a matrix of aggregated historical network traffic data such that the matrix of aggregated historical network traffic data is decomposed into a low rank matrix and a sparse noise matrix; and
performing a singular value decomposition on the low rank matrix to generate the singular value matrix and the data pattern matrix, wherein the singular value matrix and the data pattern matrix form the anomaly detection model, wherein the temporal indicators comprise at least one of: a timestamp, an internet protocol address, a transmission control protocol flag, a traffic direction, or port and protocol information;
storing the singular value matrix and the data pattern matrix of the anomaly detection model;
receiving streaming network traffic data;
performing a log transform on the streaming network traffic data;
applying the anomaly detection model to a matrix of the streaming network traffic data;
detecting at least one anomalous pattern in the streaming network traffic data based on patterns identified by the anomaly detection model; and
associating the at least one anomalous pattern in the streaming network traffic data with at least one internet protocol address.

2. The method of claim 1, wherein the low rank approximation is performed using a principal component pursuit methodology.

3. The method of claim 1, wherein the detecting the at least one anomalous pattern comprises:
calculating a matrix of the streaming network traffic data in a singular value decomposition space using the singular value matrix and the data pattern matrix;
transforming the matrix of the streaming network traffic data from the singular value decomposition space to a data space using the singular value matrix and the data pattern matrix;
performing an error calculation between a row of the matrix of the streaming network traffic data and a corresponding row of the transformed matrix of the streaming network traffic data;
determining whether an error calculation value exceeds a threshold value; and
in response to determining that the error calculation value exceeds the threshold value, identifying a corresponding streaming network traffic data as anomalous.

4. The method of claim 3, wherein the performing the error calculation comprises:
performing a sum of squared error calculation between the row of the matrix of the streaming network traffic data and the corresponding row of the transformed matrix of the streaming network traffic data.

5. The method of claim 3, wherein the calculating the matrix of the streaming network traffic data in the singular value decomposition space comprises:

solving a matrix equation $Ux=XV\Sigma^{-1}$, where Ux is the matrix of the streaming network traffic data in the singular value decomposition space, X is a matrix of the streaming network traffic data, V is the data pattern matrix of the anomaly detection model, and $\Sigma^{-1}$ is an inverse of the singular value matrix of the anomaly detection model.

6. The method of claim 3, wherein the transforming the matrix of the streaming network traffic data from the singular value decomposition space to the data space comprises:

solving a matrix equation $\hat{X}=Ux\Sigma V^T$, where $\hat{X}$ is the transformed matrix in the data space, Ux is the matrix of the streaming network traffic data in the singular value decomposition space, $\Sigma$ is the singular value matrix, and $V^T$ is a transpose of the data pattern matrix.

7. The method of claim 1, further comprising:

scoring a severity of the at least one anomalous pattern in the streaming network traffic data based on the patterns identified by the anomaly detection model.

8. A system comprising:

a memory;

a network interface; and one or more processors in communication with the memory and the network interface, the one or more processors configured to:

create an anomaly detection model including a singular value matrix and a data pattern matrix from a matrix of historical network traffic data, wherein the one or more processors are configured to create the anomaly detection model by being configured to:

aggregate volumetric data of the historical network traffic data based on temporal indicators;

perform a log transform of the aggregated volumetric data;

perform a low rank approximation of a matrix of aggregated historical network traffic data such that the matrix of aggregated historical network traffic data is decomposed into a low rank matrix and a sparse noise matrix; and perform a singular value decomposition on the low rank matrix to generate the singular value matrix and the data pattern matrix, wherein the temporal indicators comprise at least one of: a timestamp, an internet protocol address, a transmission control protocol flag, a traffic direction, or port and protocol information;

store the singular value matrix and the data pattern matrix of the anomaly detection model;

receive streaming network traffic data;

perform a log transform on the streaming network traffic data;

apply the anomaly detection model to a matrix of the streaming network traffic data;

detect at least one anomalous pattern in the streaming network traffic data based on patterns identified by the anomaly detection model; and associate the at least one anomalous pattern in the streaming network traffic data with at least one internet protocol address.

9. The system of claim 8, wherein the one or more processors are configured to perform the low rank approximation using a principal component pursuit methodology.

10. The system of claim 8, wherein the detecting the at least one anomalous pattern comprises:

calculate a matrix of the streaming network traffic data in a singular value decomposition space using the singular value matrix and the data pattern matrix;

transform the matrix of the streaming network traffic data from the singular value decomposition space to a data space using the singular value matrix and the data pattern matrix;

perform an error calculation between a row of the matrix of the streaming network traffic data and a corresponding row of the transformed matrix of the streaming network traffic data;

determine whether an error calculation value exceeds a threshold value; and in response to determining that the error calculation value exceeds the threshold value, identifying a corresponding streaming network traffic data as anomalous.

11. The system of claim 8, wherein the one or more processors are further configured to:

score a severity of the at least one anomalous pattern in the streaming network traffic data based on the patterns identified by the anomaly detection model.

12. A non-transitory computer-readable storage medium storing instructions which, when executed by a processor, cause the processor to perform operations, the operations comprising:

creating an anomaly detection model including a singular value matrix and a data pattern matrix from a matrix of historical network traffic data, wherein the creating the anomaly detection model comprises:

aggregating volumetric data of the historical network traffic data based on temporal indicators;

performing a log transform of the aggregated volumetric data;

performing a low rank approximation of a matrix of aggregated historical network traffic data such that the matrix of aggregated historical network traffic data is decomposed into a low rank matrix and a sparse noise matrix; and performing a singular value decomposition on the low rank matrix to generate the singular value matrix and the data pattern matrix, wherein the singular value matrix and the data pattern matrix form the anomaly detection model, wherein the temporal indicators comprise at least one of: a timestamp, an internet protocol address, a transmission control protocol flag, a traffic direction, or port and protocol information;

storing the singular value matrix and the data pattern matrix of the anomaly detection model;

receiving streaming network traffic data;

performing a log transform on the streaming network traffic data;

applying the anomaly detection model to a matrix of the streaming network traffic data;

detecting at least one anomalous pattern in the streaming network traffic data based on patterns identified by the anomaly detection model; and associating the at least one anomalous pattern in the streaming network traffic data with at least one internet protocol address.

13. The non-transitory computer-readable storage medium of claim 12, wherein the low rank approximation is performed using a principal component pursuit methodology.

14. The non-transitory computer-readable storage medium of claim 12, wherein the detecting the at least one anomalous pattern comprises:

calculating a matrix of the streaming network traffic data in a singular value decomposition space using the singular value matrix and the data pattern matrix;

transforming the matrix of the streaming network traffic data from the singular value decomposition space to a data space using the singular value matrix and the data pattern matrix;

performing an error calculation between a row of the matrix of the streaming network traffic data and a corresponding row of the transformed matrix of the streaming network traffic data;

determining whether an error calculation value exceeds a threshold value; and in response to determining that the error calculation value exceeds the threshold value, identifying a corresponding streaming network traffic data as anomalous.

15. The non-transitory computer-readable storage medium of claim 14, wherein the performing the error calculation comprises:

performing a sum of squared error calculation between the row of the matrix of the streaming network traffic data and the corresponding row of the transformed matrix of the streaming network traffic data.

16. The non-transitory computer-readable storage medium of claim 14, wherein the calculating the matrix of the streaming network traffic data in the singular value decomposition space comprises:

solving a matrix equation $Ux=XV\Sigma^{-1}$, where Ux is the matrix of the streaming network traffic data in the singular value decomposition space, X is a matrix of the streaming network traffic data, V is the data pattern matrix of the anomaly detection model, and $\Sigma^{-1}$ is an inverse of the singular value matrix of the anomaly detection model.

17. The non-transitory computer-readable storage medium of claim 14, wherein the transforming the matrix of the streaming network traffic data from the singular value decomposition space to the data space comprises:

solving a matrix equation $\hat{X}=Ux\Sigma V^T$, where $\hat{X}$ is the transformed matrix in the data space, Ux is the matrix of the streaming network traffic data in the singular value decomposition space, $\Sigma$ is the singular value matrix, and $V^T$ is a transpose of the data pattern matrix.

18. The non-transitory computer-readable storage medium of claim 14, wherein the transforming the matrix of the streaming network traffic data from the singular value decomposition space to the data space comprises:

solving a matrix equation $\hat{X}=Ux\Sigma V^T$, where $\hat{X}$ is the transformed matrix in the data space, Ux is the matrix of the streaming network traffic data in the singular value decomposition space, $\Sigma$ is the singular value matrix, and $V^T$ is a transpose of the data pattern matrix.

19. The non-transitory computer-readable storage medium of claim 12, the operations further comprising:

scoring a severity of the at least one anomalous pattern in the streaming network traffic data based on the patterns identified by the anomaly detection model.

20. The non-transitory computer-readable storage medium of claim 12, wherein the cumulative distribution function is based on shape and scale parameters of an exponentiated Weibull probability distribution function fitted to a plurality of error calculation results.

* * * * *